United States Patent
Brotz

Patent Number: 5,284,606
Date of Patent: Feb. 8, 1994

[54] SPHERE PRODUCTION PROCESS AT ZERO GRAVITY

[76] Inventor: Gregory R. Brotz, P.O. Box 1322, Sheboygan, Wis. 53081

[21] Appl. No.: 768,175

[22] Filed: Sep. 30, 1991

Related U.S. Application Data

[63] Continuation-in-part of Ser. No. 947,405, Dec. 29, 1986, abandoned, which is a continuation-in-part of Ser. No. 620,688, Jun. 14, 1984, abandoned.

[51] Int. Cl.⁵ .................. B29D 22/00; C01B 31/00
[52] U.S. Cl. ............................ 264/29.1; 264/40.3; 264/154; 264/271.1; 264/574
[58] Field of Search .......... 264/5, 12, 50, 29.1, 264/54, 40.3, 574, 271.1, 154

[56] References Cited

U.S. PATENT DOCUMENTS

| | | | |
|---|---|---|---|
| 3,786,134 | 1/1974 | Amagi et al. | 264/53 |
| 4,017,290 | 4/1977 | Budrick et al. | 264/54 |
| 4,279,632 | 7/1981 | Frosch et al. | 264/50 |
| 4,303,431 | 12/1981 | Torobin | 264/5 |
| 4,303,432 | 12/1981 | Torobin | 264/50 |
| 4,303,433 | 12/1981 | Torobin | 264/50 |
| 4,344,787 | 8/1982 | Wang et al. | 264/5 |
| 4,548,767 | 10/1985 | Hendricks | 264/574 |
| 4,929,400 | 5/1990 | Rembaum et al. | 264/5 |

FOREIGN PATENT DOCUMENTS 53-006184 3/1978 Japan ...................... 264/54

*Primary Examiner*—Allan R. Kuhns
*Attorney, Agent, or Firm*—William Nitkin

[57] ABSTRACT

Methods to create hollow spheres and spheres produced according to such methods, such methods including suspending in a chamber at zero gravity a gas-generating pellet in a resin material which gas-generating pellet is caused to produce gas expanding the resin into a spherical mass; methods of coating sphere-forming material on a spherical liquid mass, hardening the coating and removing the liquid mass leaving the thus formed hollow sphere and methods of blowing bubbles of resin to form spheres.

10 Claims, 20 Drawing Sheets

AIR SUPPLY

SPHERE PRODUCTION PROCESS AT ZERO GRAVITY

This application is a continuation-in-part of my previous application under the same title, Ser. No. 947,405 filed Dec. 29, 1986 now abandoned which was a continuation-in-part of my previous application entitled Sphere Production Process, Ser. No. 620,688 filed Jun. 14, 1984, now abandoned.

BACKGROUND OF THE INVENTION

1. Field of the Invention

This invention relates to sphere production techniques at zero gravity and more particularly relates to a method of producing strong lightweight carbon or other material spheres for a variety of uses.

2. History of the Prior Art

The production of materials in space in a weightless environment including the manufacture of hollow metal spheres has been appreciated and discussed in the prior art in U.S. Pat. No. 3,534,926 to H. F. Wuenscher entitled Space Manufacturing, Machine. The production of hollow spheres in a normal environment has been disclosed such as in U.S. Pat. No. 4,303,603 to Torobin.

SUMMARY OF THE INVENTION

It is an object of this invention in some embodiments to manufacture in a zero gravity environment, such as in space, hollow spheres and other shapes which can be useful for a variety of purposes. These spheres would be strong, lightweight and have walls of varying thicknesses.

One process that can be utilized for the production of the spheres of this invention is to take a globule of molten resin containing a percentage of elastomers and ultraviolet curing agents and/or heat-activated curing agents and suspend it in a zero gravity condition by a device such as an injector adapted to enter the molten resin into a chamber. The chamber is filled with a boiling organic liquid which has a boiling point close to that of the melting point of the resin but which is not a solvent for the resin. A pellet of gas-generating material is engulfed inside the resin globule by first wetting the pellet with an amount of resin and placing it in the chamber where it contacts a small amount of molten resin as the resin is extruded from the end of an injector, the outlet of which is inserted within the chamber. As the resin is extruded from the injector, it engulfs the gas-generating pellet due to the physical properties of the zero gravity environment. A pellet wetted with resin when contacting the globule has its wetted coating form a combined liquid with the resin globule at their point of contact. Surface tension will naturally contract the surface of the combined liquid molten resin and such surface tension will contract the wetted pellet into the globule of liquid resin. The total energies of the surface tension of the liquid molten resin as the pellet becomes engulfed, becomes progressively smaller until progressing to a minimum energy level with the pellet then enclosed and engulfed within the liquid resin sphere. Geometrically a sphere has the minimum surface area that can enclose a given volume which in this case in the volume of the wetted pellet plus the volume of the original liquid molten resin sphere. The combination of the pellet and resin sphere will by itself fall into such minimum energy state, causing the wetted pellet to become automatically contained within the liquid resin sphere. The organic liquid in the chamber can be maintained at its boiling point to provide a constant bathing of the globule while it is being extruded from the injector. This bathing of the globule in the boiling liquid is important because it prevents any drying of the resin globule's surface and the surface of the pellet of gas-generating material. The prior wetting of the surface of the pellet of gas-generating material with resin causes the pellet to move freely within the resin globule: Because the density of the pellet is greater than the density of the resin, the resin has a higher degree of freedom of movement due to its lower inertial mass. The containing of the pellet can be facilitated by puffs of gas directed at the globule of resin inside the chamber after the injector has been removed. The pellet of gas-generating material can be chosen from many materials ranging from a high explosive to a material yielding a subtle slowly-occurring gas-generating chemical reaction. It is during the period that the reactants are mixing and before the actual gas is formed out of the pellet that the pellet should be contained in the globule formation.

As gas from the pellet forms, it causes the resin to be blown outward like a balloon but in a molten state. After gas generation has ceased, the sphere so produced is held in its expanded condition until all temperature and pressure values have reached equilibrium. The temperature of the chamber is then lowered causing the organic liquid to condense on the walls of the chamber. The exterior surface of the newly formed sphere will dry and solidify and eventually the entire sphere wall will become solid. The resin from which the sphere is made can be cured by heat, ultraviolet light, heat-activated catalytic reaction or any equivalent means. The chamber can include ultraviolet lamps, internal or external heating elements, or be equipped with a port utilized for the introduction of gaseous or liquid curing agents into the chamber. For example, in the case in which a novolac phenolic is utilized, a curing agent of formaldehyde as a gas or in solution can be used as a curing agent. In the case of a resole phenolic, hydrochloric acid can be introduced into the chamber as a curing agent. A sphere so produced is utilizable as is or can be painted, coated, wound by filaments and the like and if desired, can be carbonized in a furnace although a vent hole should be made therein for such process.

Other types of spheres can be made such as ones formed from bubbles which can be made from curable materials cured in a processing chamber. Still yet another type of sphere can be formed by plating a coating on a liquid sphere and removing the liquid center after hardening the sphere.

These and other objects and embodiments of the invention will become clearer with reference to the following drawings and descriptions thereof.

DESCRIPTION OF THE PREFERRED EMBODIMENTS

Figure 1:
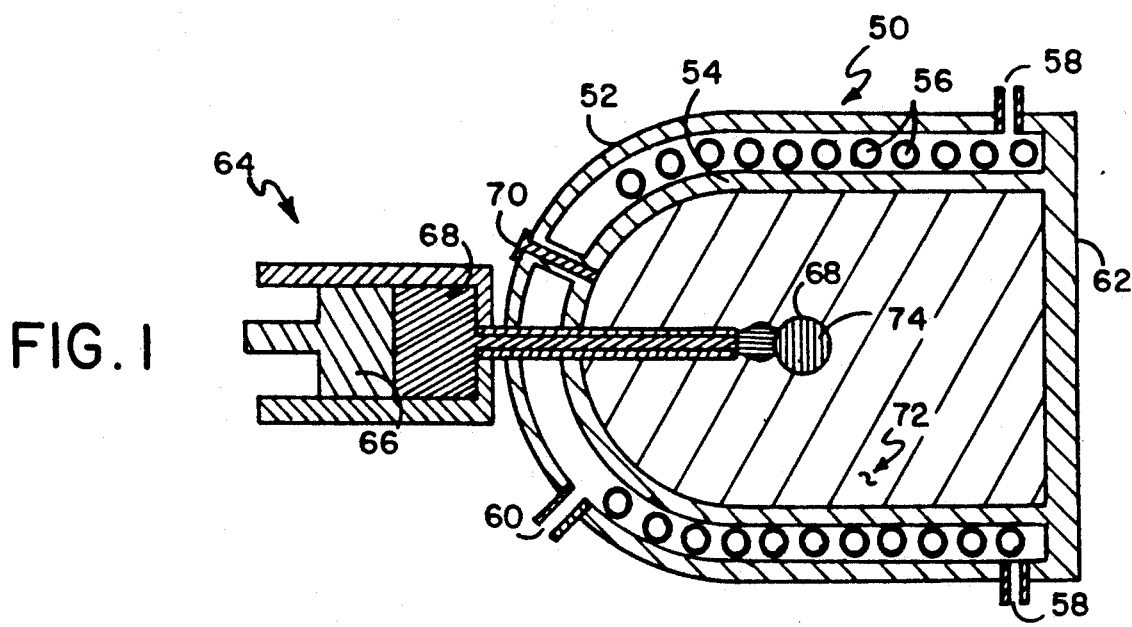
FIG. 1 illustrates the start of the formation of a globule around a wetted gas-generating pellet within a processing chamber.
Figure 2:
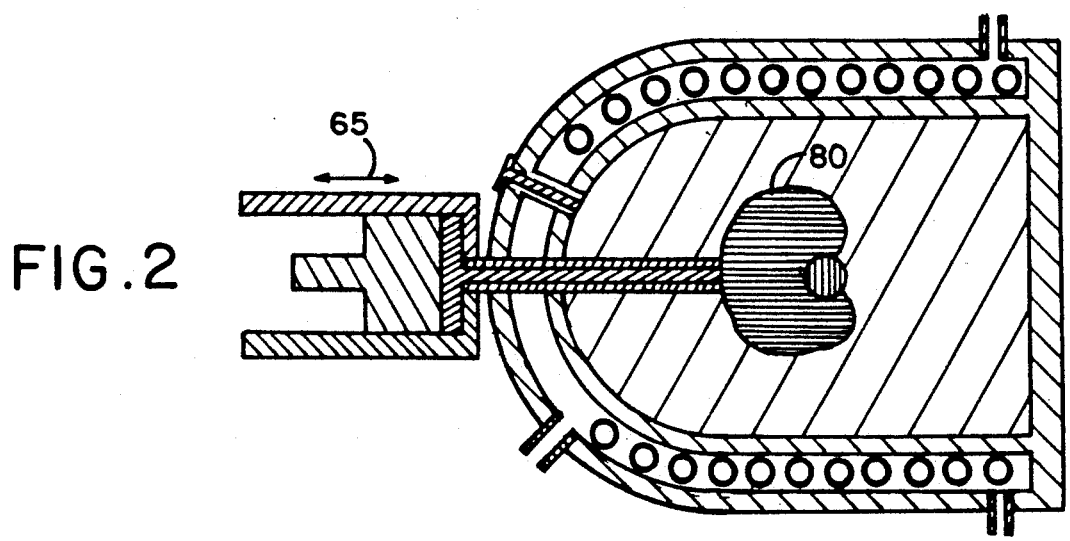
FIG. 2 illustrates the enlargement of the extruded resin with the gas-generating pellet penetrating the surface of the resin globule.
Figure 3:
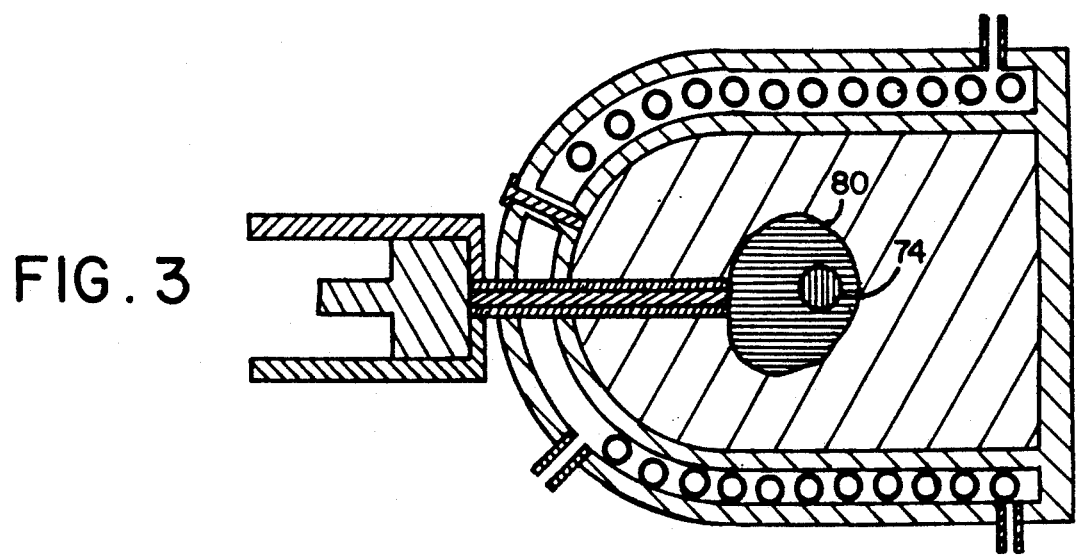
FIG. 3 illustrates the pellet within the extruded resin globule.
Figure 4:
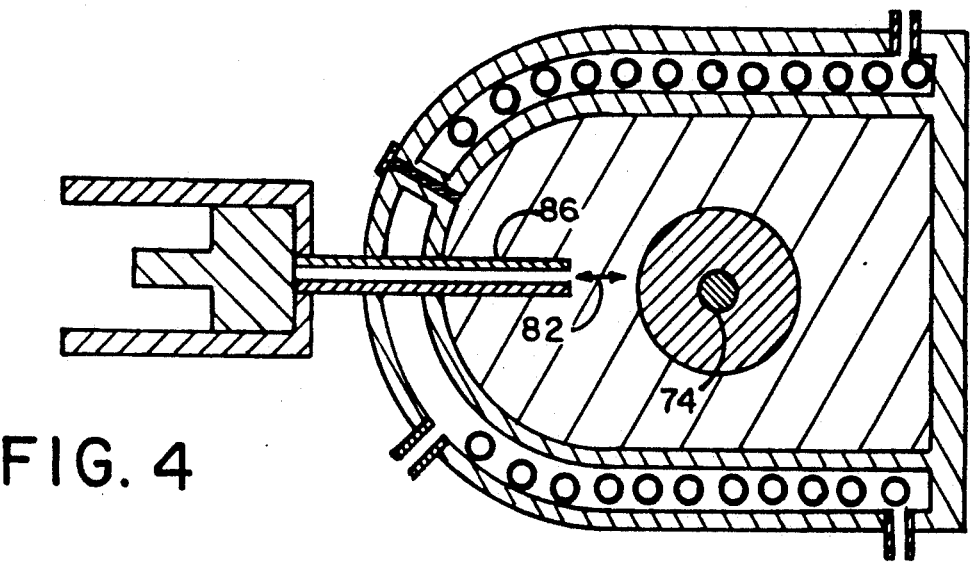
FIG. 4 illustrates the pellet containing itself within the extruded resin globule with the injector moving back and away from the resin globule.
Figure 5:
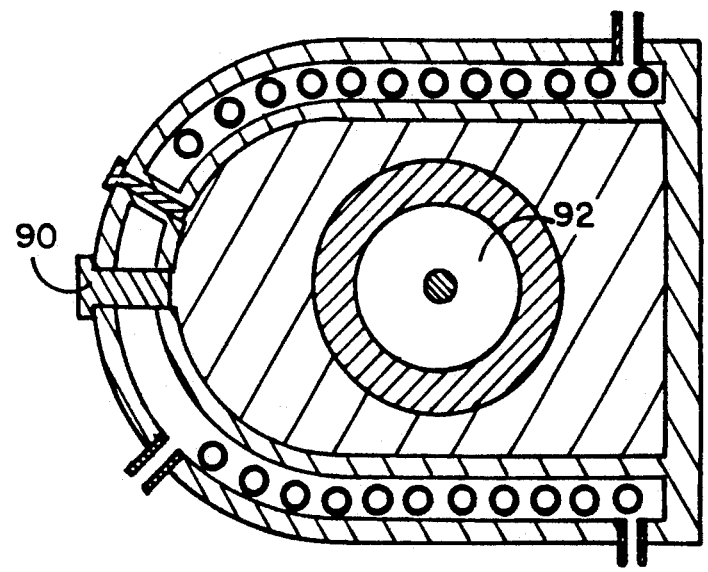
FIG. 5 illustrates the gas-generating pellet starting to form gas with a plug inserted in place of the injector.
Figure 6:
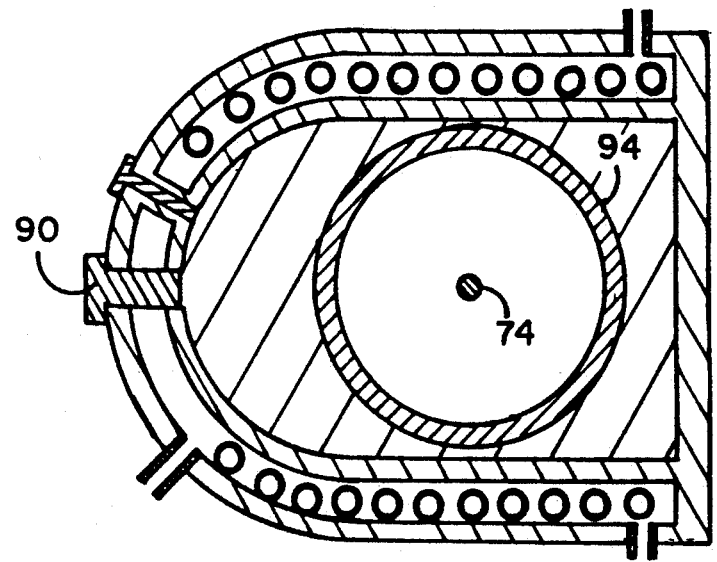
FIG. 6 illustrates the gas-generating pellet close to the end of its gas-forming reaction and the sphere of molten resin close to its full size.
Figure 7:
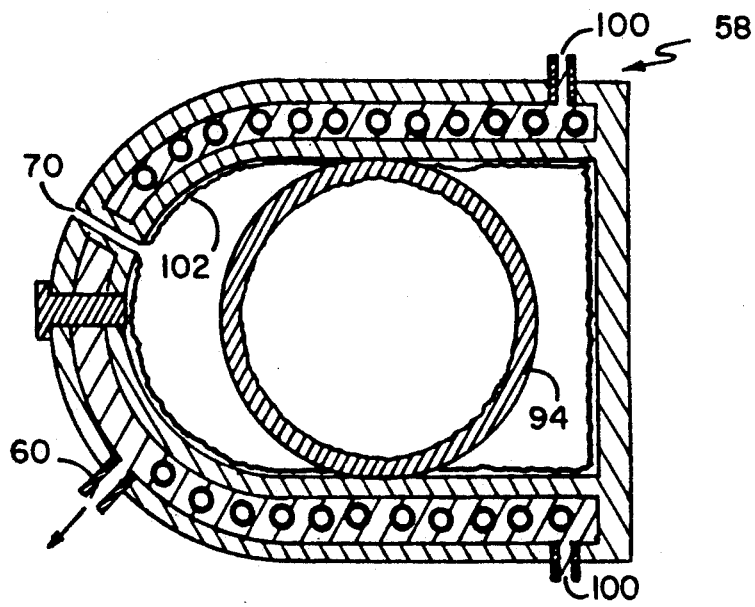
FIG. 7 illustrates the cooling process with the organic liquid condensing on the chamber's walls and the sphere now having a solid wall.
Figure 8:
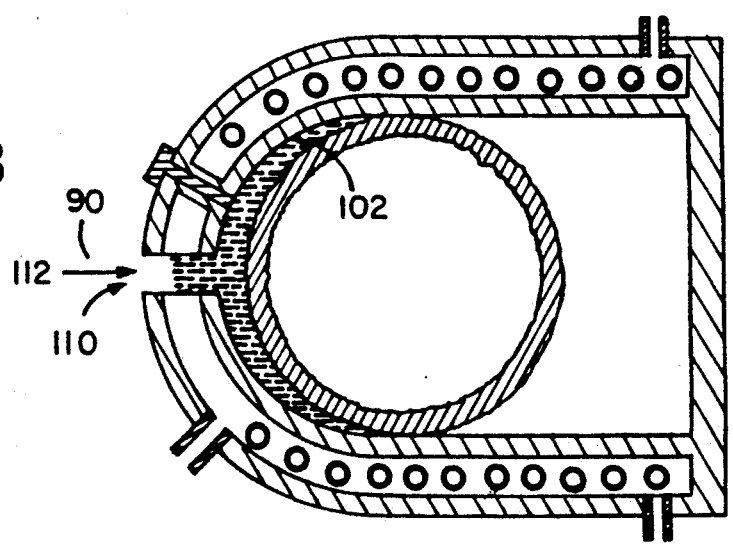
FIG. 8 illustrates the organic liquid being removed from the chamber.
Figure 9:
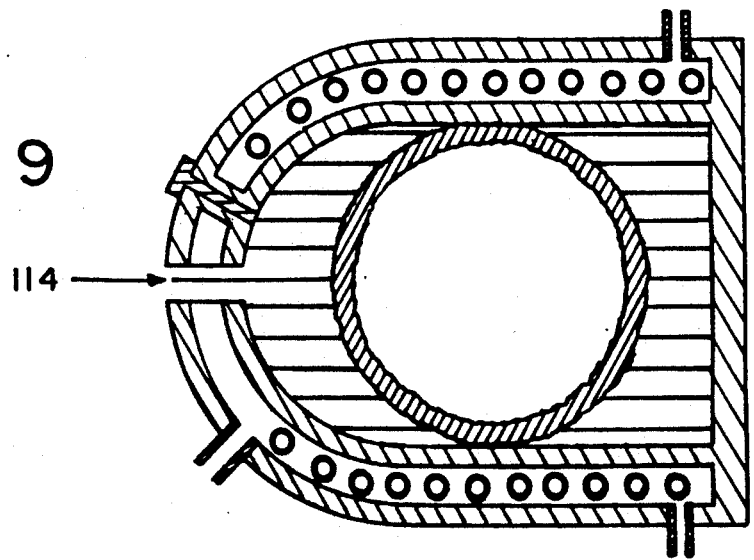
FIG. 9 illustrates the introduction of a curing agent.
Figure 10:
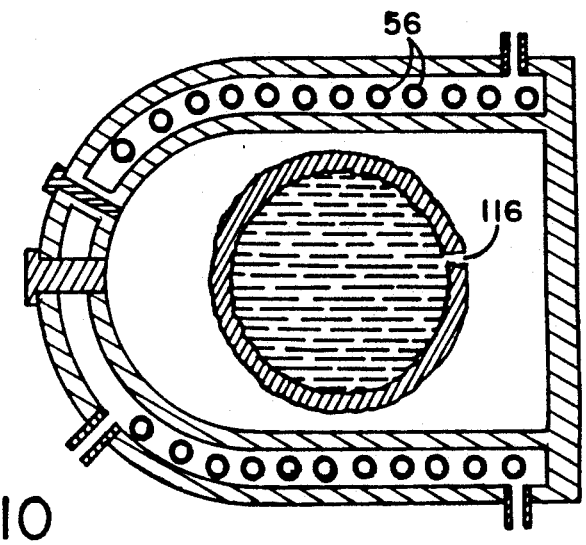
FIG. 10 illustrates the chamber being used as a furnace to carbonize the sphere which has a vent hole therein.
Figure 11:
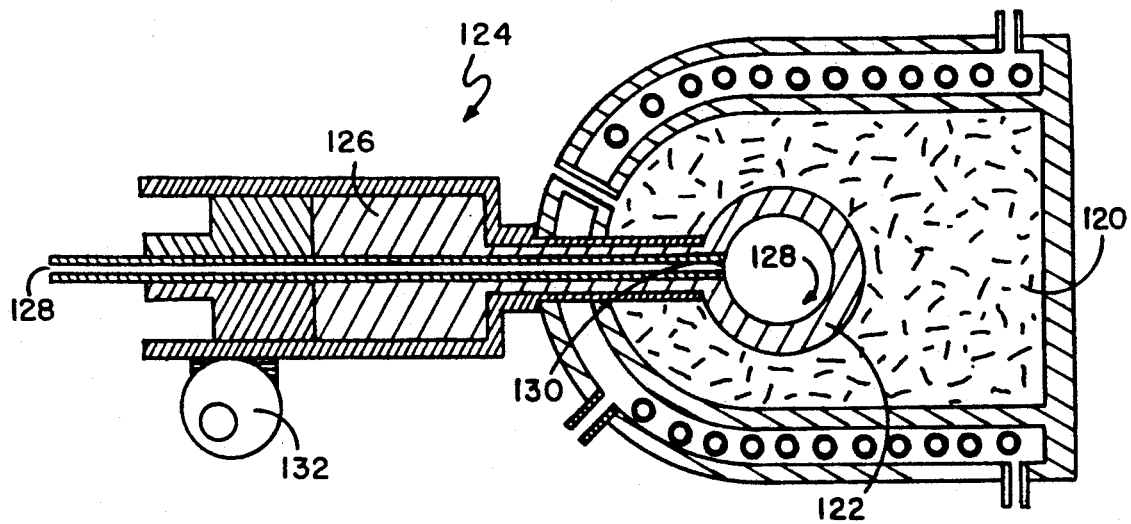
FIG. 11 illustrates the chamber utilized for the production of a sphere with a retractable gas inlet tube to provide the gas to expand the globule into a sphere with fibers within the chamber to form and become part of the wall of the sphere.

One can utilize a sphere-forming chamber in which to form spheres such as illustrated in FIG. 1. Seen in FIG. 1 is chamber 50 in a zero gravity environment can be provided, such chamber being of double-walled construction with first wall 52 and second wall 54 composed of a material designed to withstand induction heating. The source of such heat can be a nuclear powered electrical generator transported into space or such such heat can be provided by solar concentrators directed onto the outside of the chamber in which case the induction coils would not be needed. The power for heating could also be provided by a conventional fuel generator. Between the walls of chamber 50 can be a water-cooled induction coil 56. First port(s) 58 can be utilized for the introduction of a cooling medium around the coils between first and second walls 52 and 54 respectively of the chamber with a second port 60 provided for the exit of such cooling medium which flow through the ports provides for circulation of the cooling fluid. Hatch 62 can be utilized for the entry of the materials into the chamber and injector 64 is introduced into a portion of the chamber having a piston 66 to drive the resin 68 into the chamber when desired. This injector can be removed from the chamber at a point during the process. Port 70, here shown plugged, into the chamber itself can also be provided. In practice to produce spheres inside the processing chamber, one first fills the chamber with an amount of gas, vaporous organic liquid or liquid medium 72 which is maintained at its boiling point which medium is selected to have a boiling point close to that of the melting point of the material to be formed into the sphere. If a liquid is to be used as medium 72, as the sphere is being blown and increasing in volume, a portion of medium 72 may be displaced through port 70. If a vaporous medium is used and port 70 is plugged as the sphere is expanding, there will be an increase in pressure in the medium, establishing equilibrium with the generated gas inside the sphere. It can be desirable to have an elevated pressure inside the chamber for certain applications, but it should be noted that in some embodiments a vaporous medium may be vented also through port 70. Medium 72 in the chamber should not be a solvent for the material to be formed into a sphere. In all the examples herein described a resin is used to form the sphere but as mentioned above, molten globules of metal, glass or other compounds could also be utilized within the spirit and scope of this invention. Also introduced into chamber 50 through hatch 62 is pellet 74 which has been wetted by surrounding it with material 68 from which the sphere is to be made. Injector 64 contains, for example, molten resin 68 and injector 64 is activated to extrude the resin into the chamber so that the resin starts to surround the gas-generating pellet as seen in FIG. 2. Injector 64 can be vibrated to facilitate the inclusion of the pellet within the molten resin. FIG. 3 shows the injector's piston at the bottom of its stroke with pellet 74 fully included within the molten globule 80 of resin. By a sudden movement backwards of the injector as seen in FIG. 4, the globule of resin is separated by space 82 from the end of nozzle 86 of the injector and pellet 74 becomes fully contained therein due to the physical forces under zero gravity as described above. FIG. 5 illustrates the chamber with plug 90 now in place of the injector with pellet 74 starting to form and generate gas 92. FIG. 6 illustrates gas pellet 74 close to the end of its gas forming reaction and sphere 94 close to its full size. FIG. 7 shows sphere 94 at its full size with a cooling liquid 100 being pumped through the space between the chamber's double walls with organic liquid 102 now condensing around the inner walls of the chamber. Pressure equalizing port 70 is opened so that as the organic material condenses, it will not form a vacuum that might rupture the sphere. Sphere 94 in this condition is now a solid and if composed of a thermoplastic such as polyethylene, polycarbonate, or glass ($SiO_2$), forms a structure which could be utilized as a finished product in a variety of uses. The organic liquid can be removed from the chamber if plug 90 is removed and the chamber is accelerated or spun as the liquid 112 will be drawn by centrifugal force out of the chamber as seen in FIG. 8. FIG. 9 shows a curing agent 114 which can be of the variety of curing agents discussed above introduced into the chamber. If the product is to be carbonized, the chamber can be used as an induction furnace with heating coils 56 to bake the sphere as seen in FIG. 10 if a sphere vent hole 116 is made therein. FIG. 11 illustrates an embodiment where fibers 120 are mixed with the medium in the chamber. The fibers, when they touch the molten surface of the sphere, will be included and become part of the molten wall of the sphere. If the sphere is formed of a thermoplastic or thermosetting resin before curing, the incorporation of fibers into the sphere wall can take place in conjunction with the wetting of the pellet with the fibers mixed into the wetting material. In the case where the sphere is formed of a molten metal, carbon or ceramic fibers can be utilized. The material of the fibers will be more easily incorporated within the sphere if they are of a higher density than the density of the material forming the sphere. Fibers of lower density than the density of the spere material will tend to stick only to the surface of the sphere and will not be drawn into and incorporated into the molten material of the sphere wall.

The processing chamber or the workpiece may be spun and if done so during the sphere formation process, the resulting product can be an ellipsoid sphere which may be useful in certain embodiments. It should be further noted that one or a plurality of spheres can be created within the chamber, especially by utilizing the process illustrated in FIG. 11 of introducing gas 128 which can be hydrogen, helium or equivalent by gas-resin injector 124 into the molten material 126 to form it into a sphere. As a globule of molten resin is extruded from gas-resin injector 124 by the action of the piston, gas 128 passes through its pipe, the end 130 of which terminates beyond the end of gas-resin injector 124 and forces gas 128 into the globule of molten resin forming a spherical bubble 122. Vibrator 132 can shake injector 124 sufficiently to break off sphere 122. Additional spheres can be formed in the chamber and these bubble spheres may also contact and fuse to form multiple spheres or adjoining partial spheres. If hydrogen gas is used to form a multiple bubble structure which is cured by heat or light, the hydrogen gas in the bubble formation would not burn or ignite as it would be sealed within the sphere as its wall structure is of a closed-cellular nature.

Figure 12:
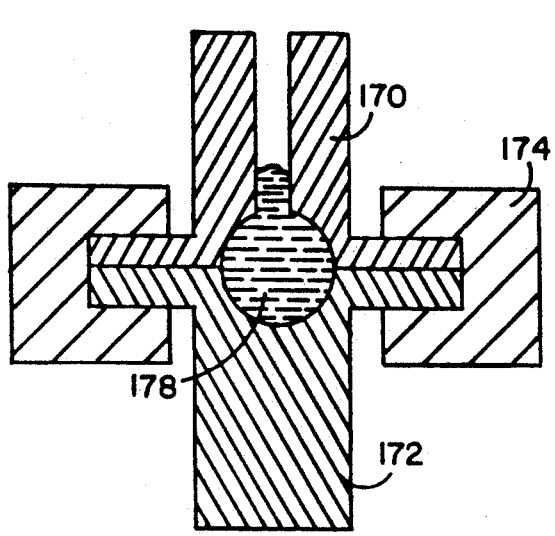
FIG. 12 illustrates a gas-generating pellet mold.
Figure 13:
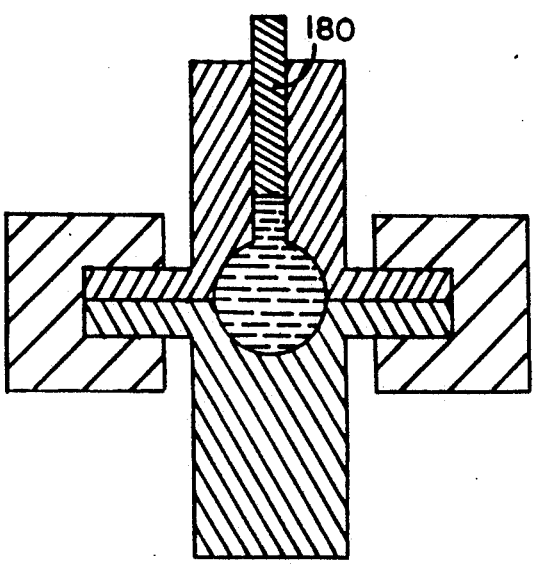
FIG. 13 illustrates the mold of FIG. 12 with pressure piston.
Figure 14:
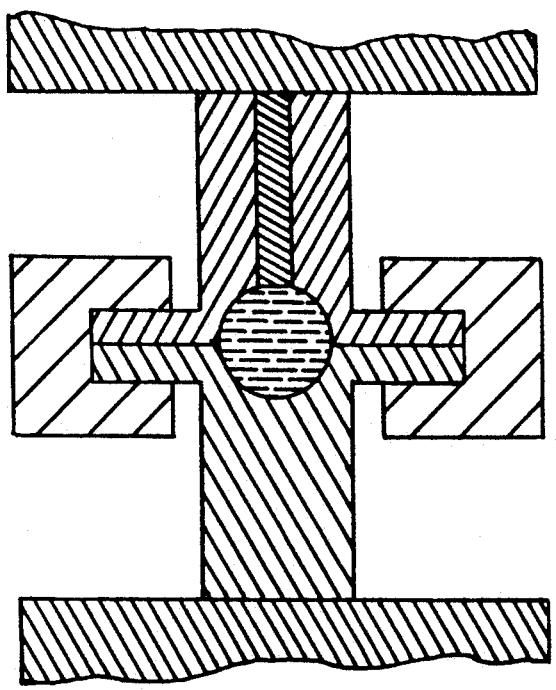
FIG. 14 illustrates the mold of FIG. 13 with piston fully advanced.
Figure 15:
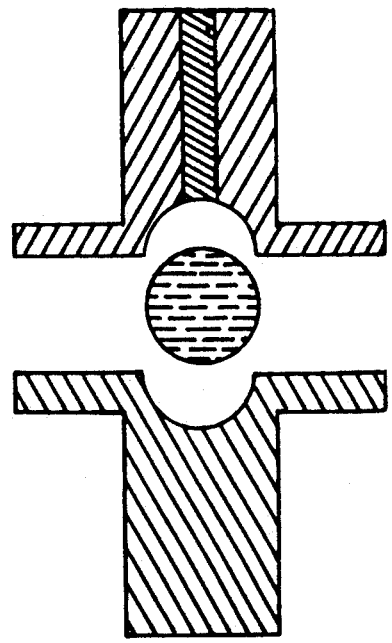
FIG. 15 illustrates the mold of FIG. 14 opened.
Figure 16:
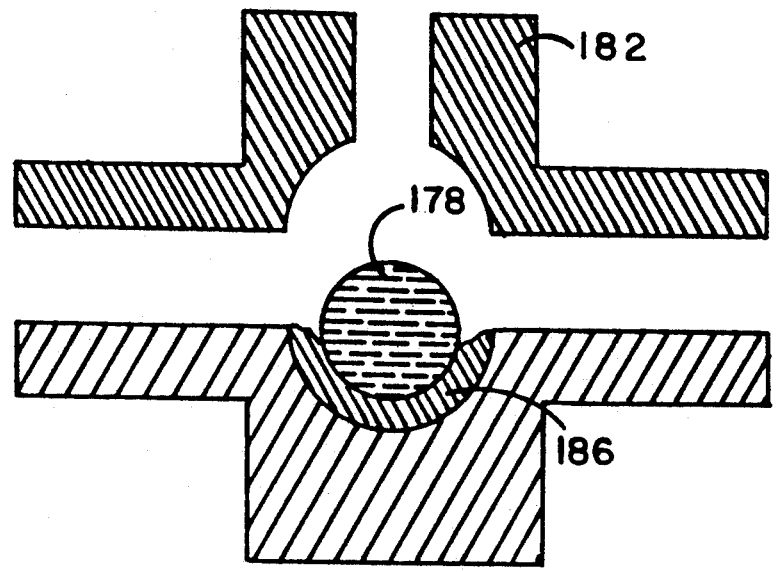
FIG. 16 illustrates the pellet placed in resin in resin mold.
Figure 17:
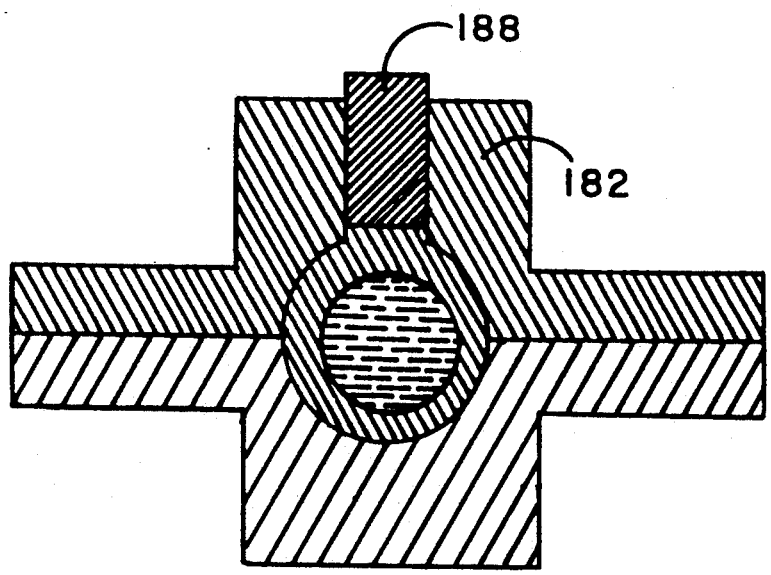
FIG. 17 illustrates the split cavity mold of FIG. 16 filled with resin around the pellet.
Figure 18:
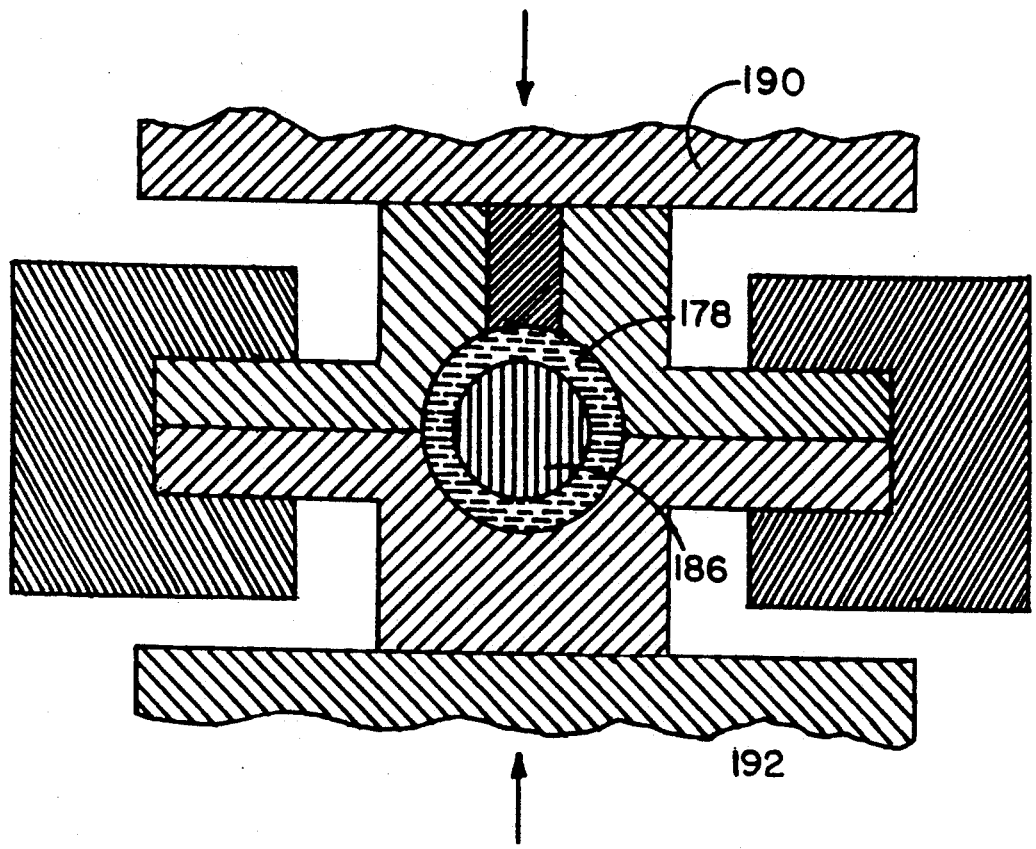
FIG. 18 illustrates the mold of FIG. 17 with pressure applied to the piston.
Figure 19:
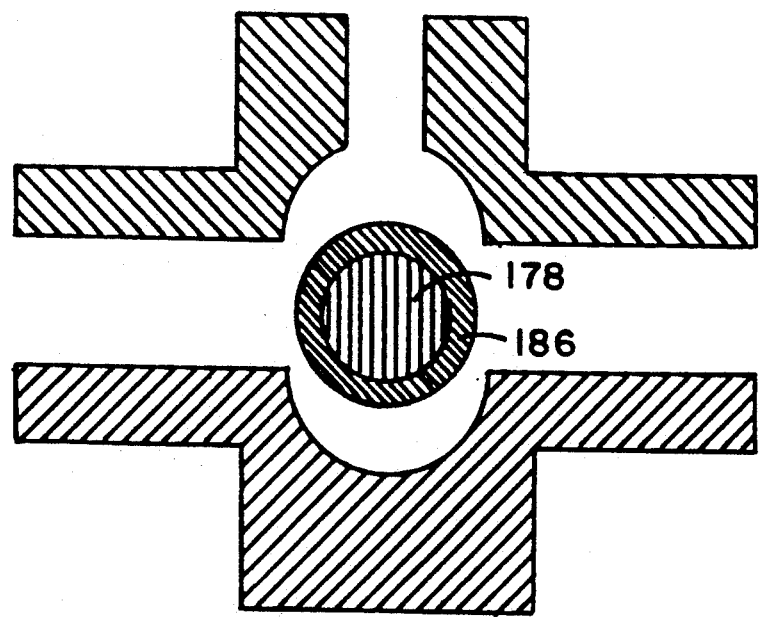
FIG. 19 illustrates the mold of FIG. 18 opened.
Figure 20:
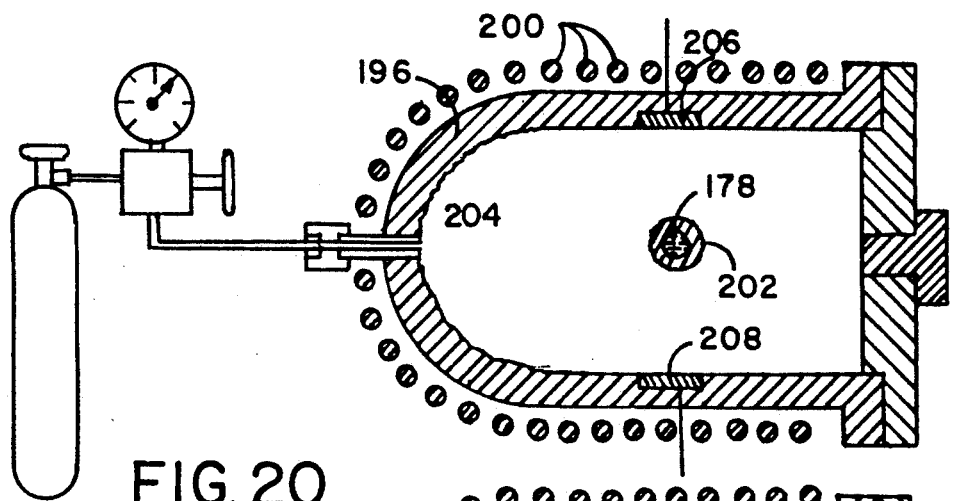
FIG. 20 illustrates the gas-generating pellet surrounded by resin of FIG. 19 in a pressurized heating chamber.
Figure 21:
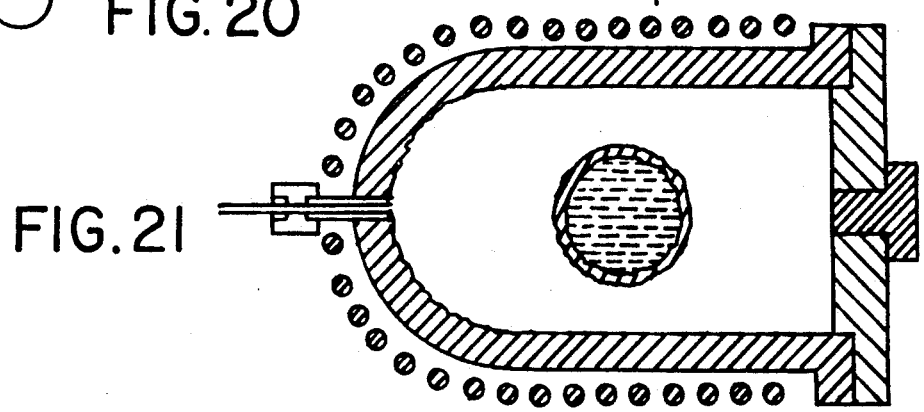
FIG. 21 illustrates the chamber of FIG. 20 with reduced pressure and pellet expanding.
Figure 22:
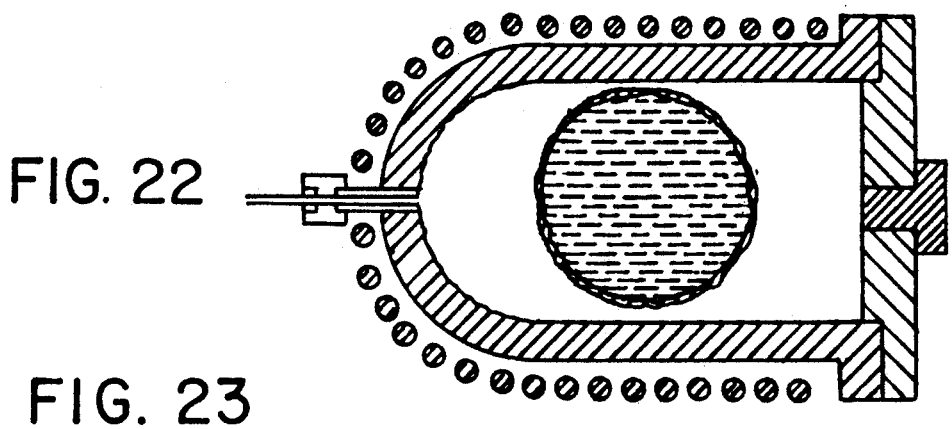
FIG. 22 illustrates the chamber of FIG. 21 with pellet further expanded.
Figure 23:
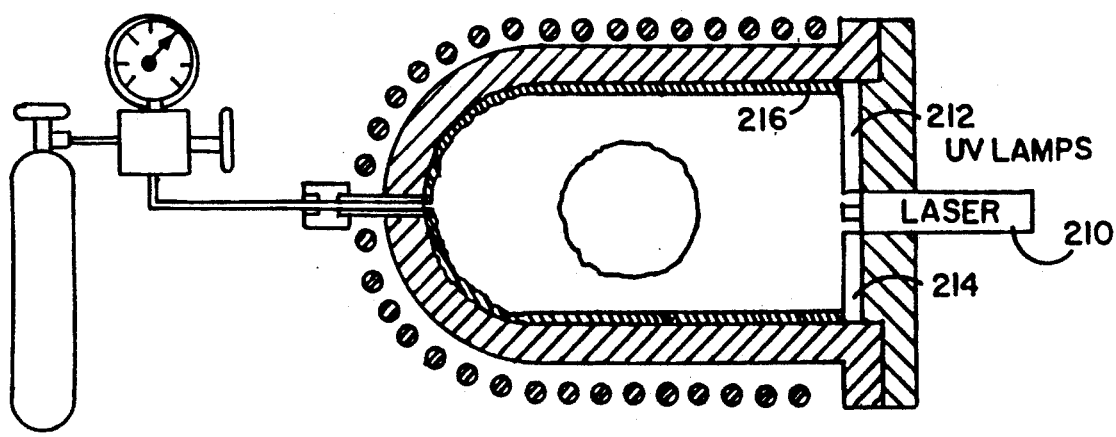
FIG. 23 illustrates a chamber with inner reflective surface, ultraviolet lamps and laser to make a hole in the sphere.

Another process of creating a mass of resin having a spherical pellet of a gas-generating material at its center and to process that pellet to produce hollow spheres is to first provide a mold in which to form the gas-generating material 178 as seen in FIG. 12 into a spherical pellet. The mold has an upper portion 170 and a lower portion 172 with a spherical cavity with a channel leading thereto through which the gas-generating material 178 is entered. Clamps 176 and 174 hold extensions of the mold together when the gas-generating material 178 is positioned therein. Force from a piston 180 as seen in FIG. 13 is applied to the gas-generating material forming a spherical pellet thereof as seen in FIG. 14 and in FIG. 15 it can be seen that clamps 176 and 174 have been removed and the pellet is free of the mold members 170 and 172. In FIG. 16 one can see the pellet 178 placed in a larger spherical mold 182 and 184 which split cavity mold has been partially filled with a powdered form 186 of the resin of which the final sphere is to be composed. In FIG. 17 the upper portion of the split cavity mold 182 has been put into place and a piston 188 is inserted to compress the resin around the now centrally located pellet. FIG. 18 shows the resin-surrounded pellet in a press with pressure applied from members 190 and 192 to fuse the resin powder 186 around the central pellet 178. FIG. 19 shows a completed pellet being removed from the mold with the central gas-generating core 178 surrounded by the fused powdered form resin 186. Such a pellet is then processed in a heating chamber 196 as seen in FIG. 20. The chamber is equipped with a pressure regulation device 198 and as the pellet heats up from the coils 200 around the chamber the sintered powdered resin melts and fuses forming a uniform molten globule 202 around the gas-generating pellet 178 as seen in chamber 204. The gas-generating material in the pellet should be of a type that will not detonate due to the heat at the temperature of the melting of the resin to be blown into the sphere. After the resin is melted, the pressure in the chamber is raised to equal the pressure of the gas that will be generated by the gas-generating pellet after it is activated. One method of internally activating the gas-generating pellet is to provide azo crystals in its composition which will be detonated by a shot irradiation of ultrasonic energy from transducers 206 and 208. After the chemical reaction is activated in the gas-producing pellet 178, the gas is produced inside of the molten resin globule 202 and the chamber pressure, as controlled by pressure control means 198 which can be a pressure tank and the like with an escape valve, is reduced such as seen in FIGS. 21 and 22 which allows the internal pellet gas pressure to expand accordingly to the reduction of pressure within chamber 204. This is done slowly so as to maintain a uniform resin shell wall as the pellet expands. The viscosity of the resin keeps the gas contained within the resin globule. This is due to visco-coherence. It is the natural tendency of heavy molecular material such as found in the resin to contain the gas within it under a zero G condition, especially with elastomeric materials. With molten materials, though, that may have a relatively low viscosity, gas might have a tendency to be ejected from therein so that the melting and blowing must be done fast enough so that as the gas blows the resin material and wall-thinning is occurring, it occurs before the gas has a chance to escape from the sphere. As the sphere enlarges, the energy for polymer shearing will be taken from the expanding gas and since this is being done in a uniform gravitational field of zero G, no tears in the expanding shell would occurr even with low viscosity molten liquids. There are also embodiments where acoustical vibrations or magnetic oscillations could be directed toward the molten globule causing the gas to remain therein since the outer walls would be in a state of dimensional flux which would offer the gas in the central pocket no path of least resistance from one instant to the next therefore containing the gas within its boundaries. FIG. 23 shows the chamber equipped with a laser 210 at its end which is utilized to make a small hole in the sphere after it has been expanded so that during the cooling cycle when the shell wall has partially solidified and the internal gas is cooling, the small hole will help to equalize the pressure between the inside of the sphere and the chamber so that as the internal gas contracts, the walls of the sphere will not collapse while the outer portion is in a semi-soft state. Laser 210 can be activated at the time of cooling when the hole will maintain itself and which would prevent a hole that might start to enlarge or that might fill itself in at other times during the process. Also seen in FIG. 23 is reflective surface within the chamber 216 and ultraviolet lamp 212 and 214 that can be used to provide ultraviolet rays within the chamber which bounce off the reflective surface 216 which ultraviolet lights are utilized when the resin materials are ultraviolet light curable.

Figure 24:
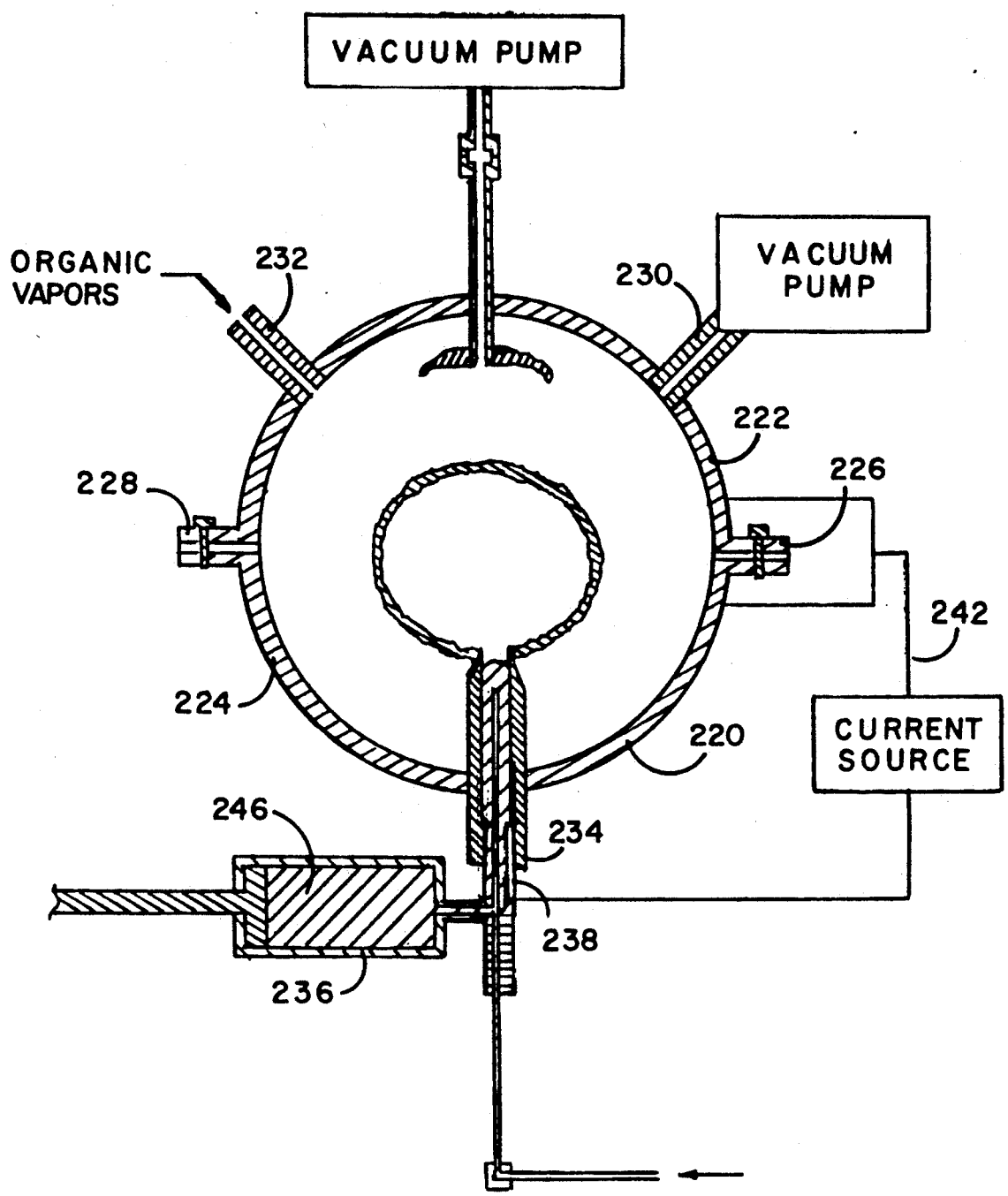
FIG. 24 illustrates a chamber for forming spheres of plating under zero G conditions.
Figure 25:
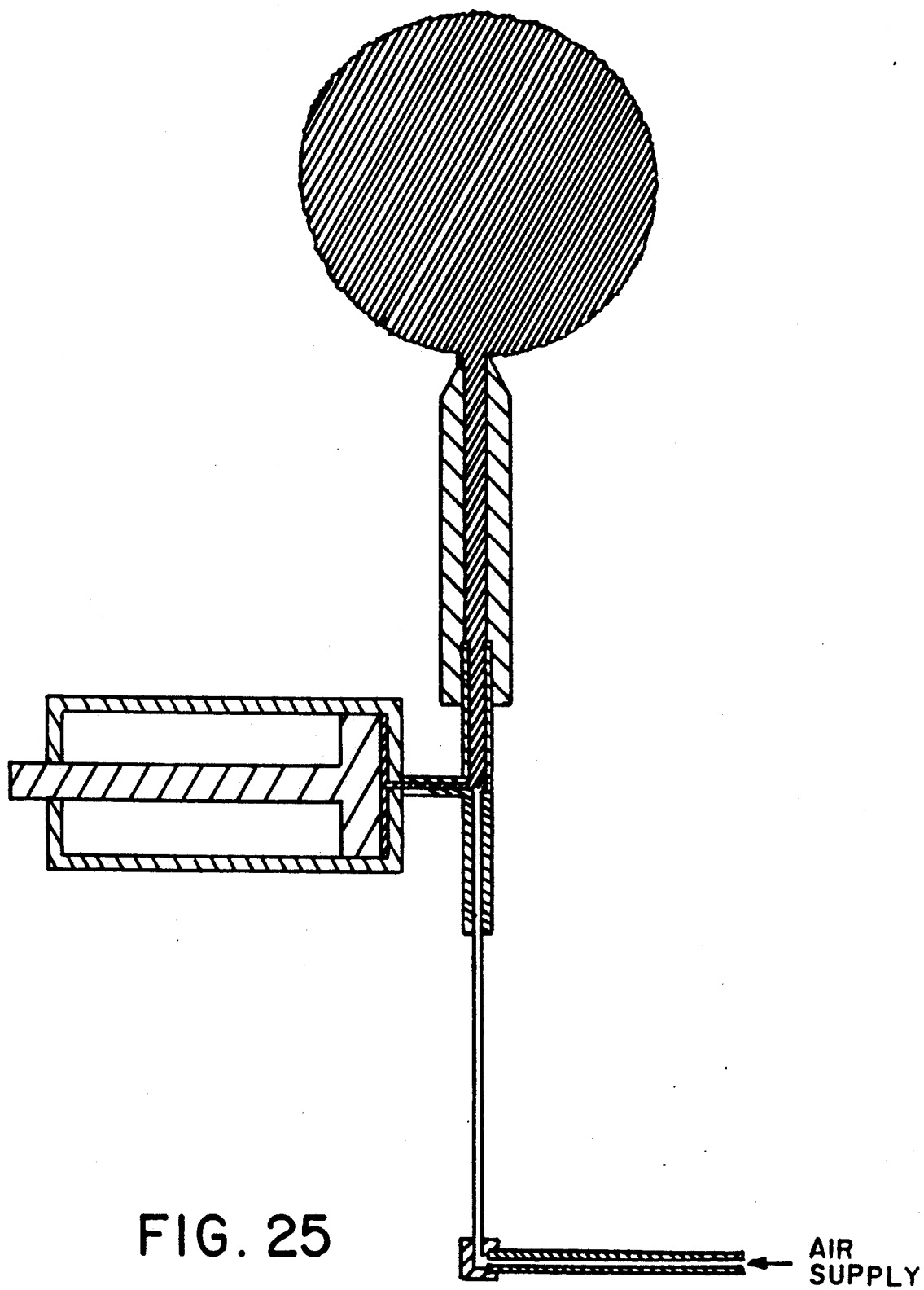
FIG. 25 illustrates a partial view of FIG. 24 showing the forming of spheres of conductive fluid material.
Figure 26:
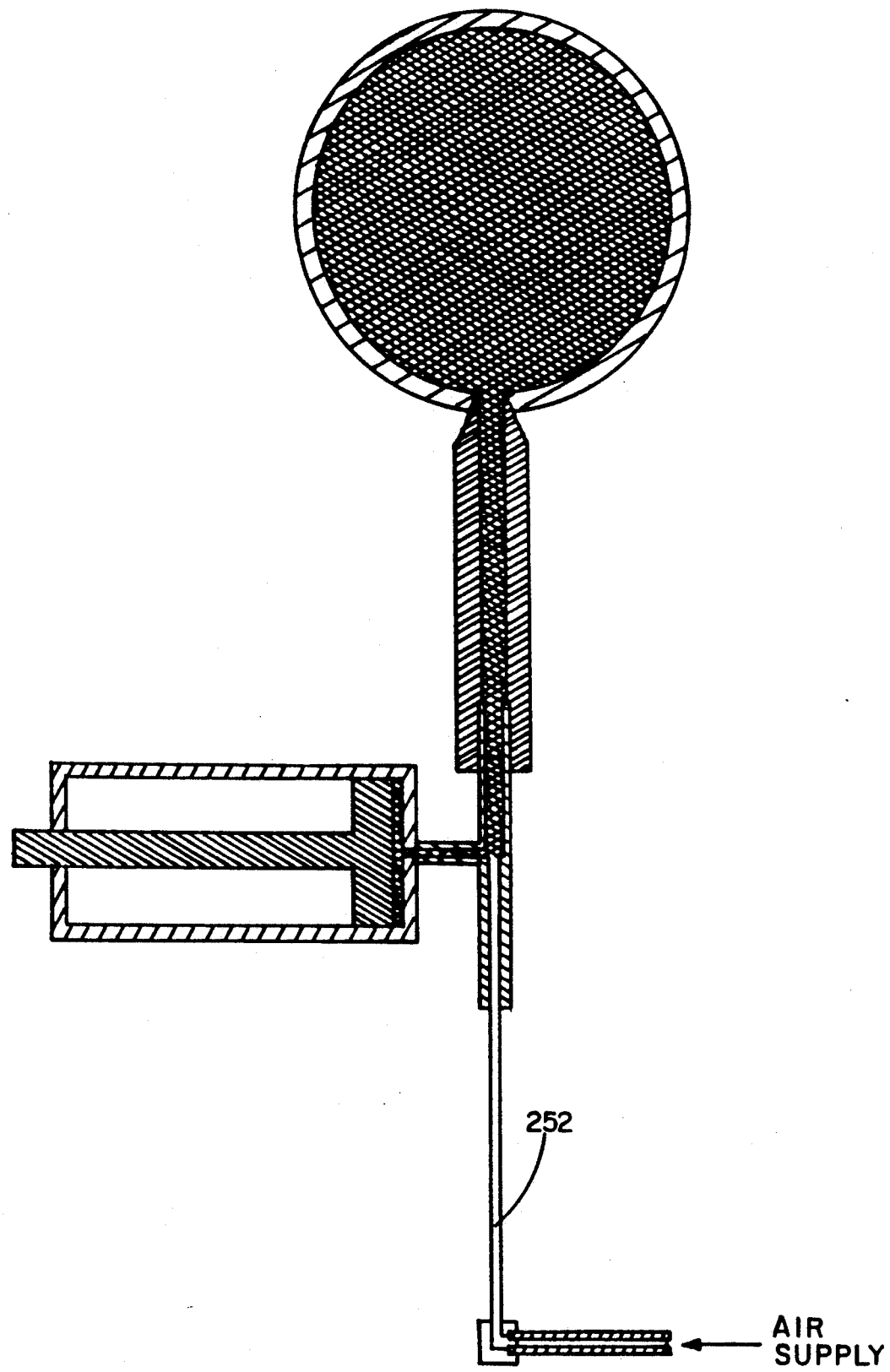
FIG. 26 illustrates the coating of material around the sphere of conductive fluid material of FIG. 25.
Figure 27:
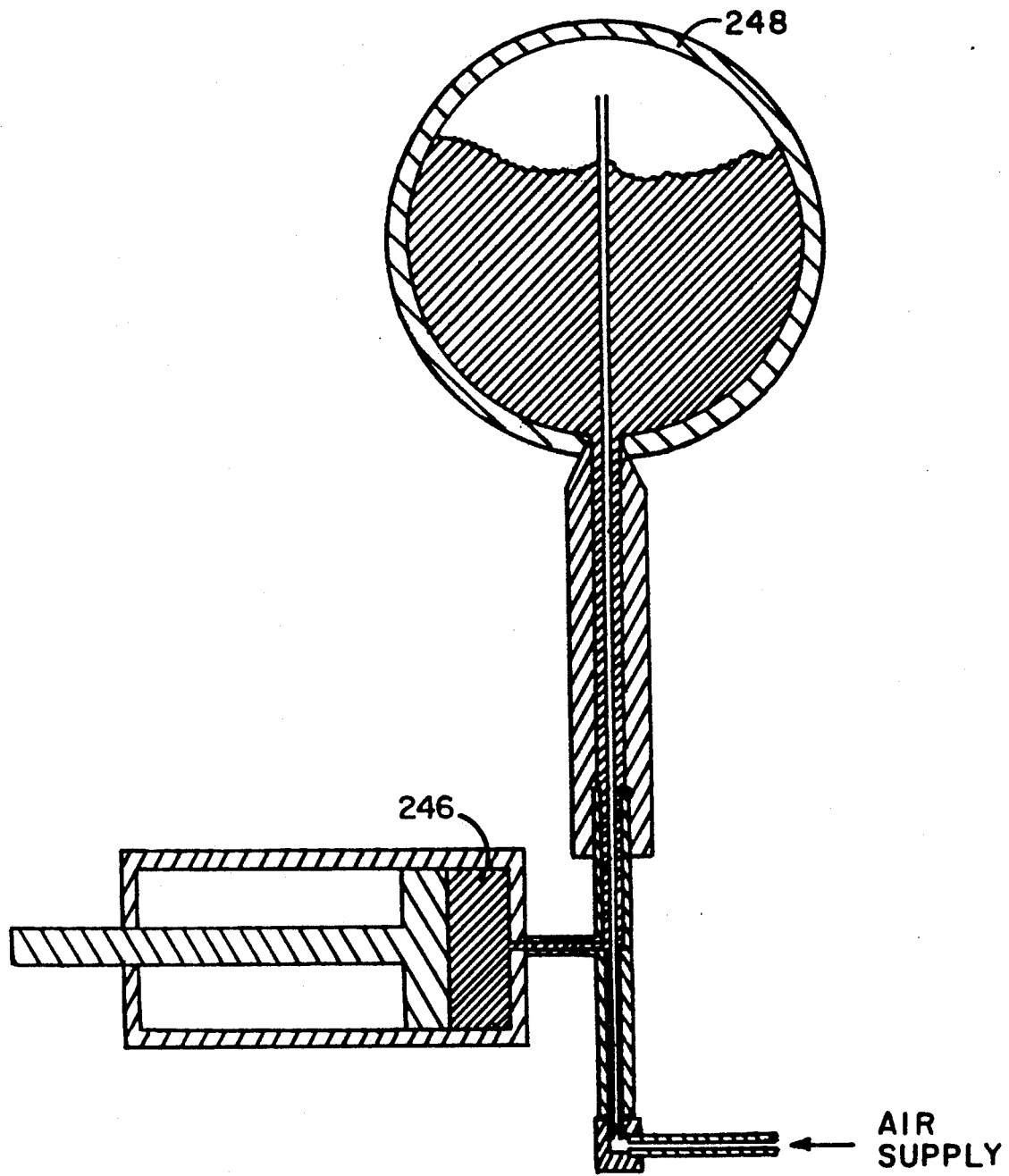
FIG. 27 illustrates injecting air into the coated sphere of FIG. 26 to force the fluid material out of such sphere.
Figure 28:
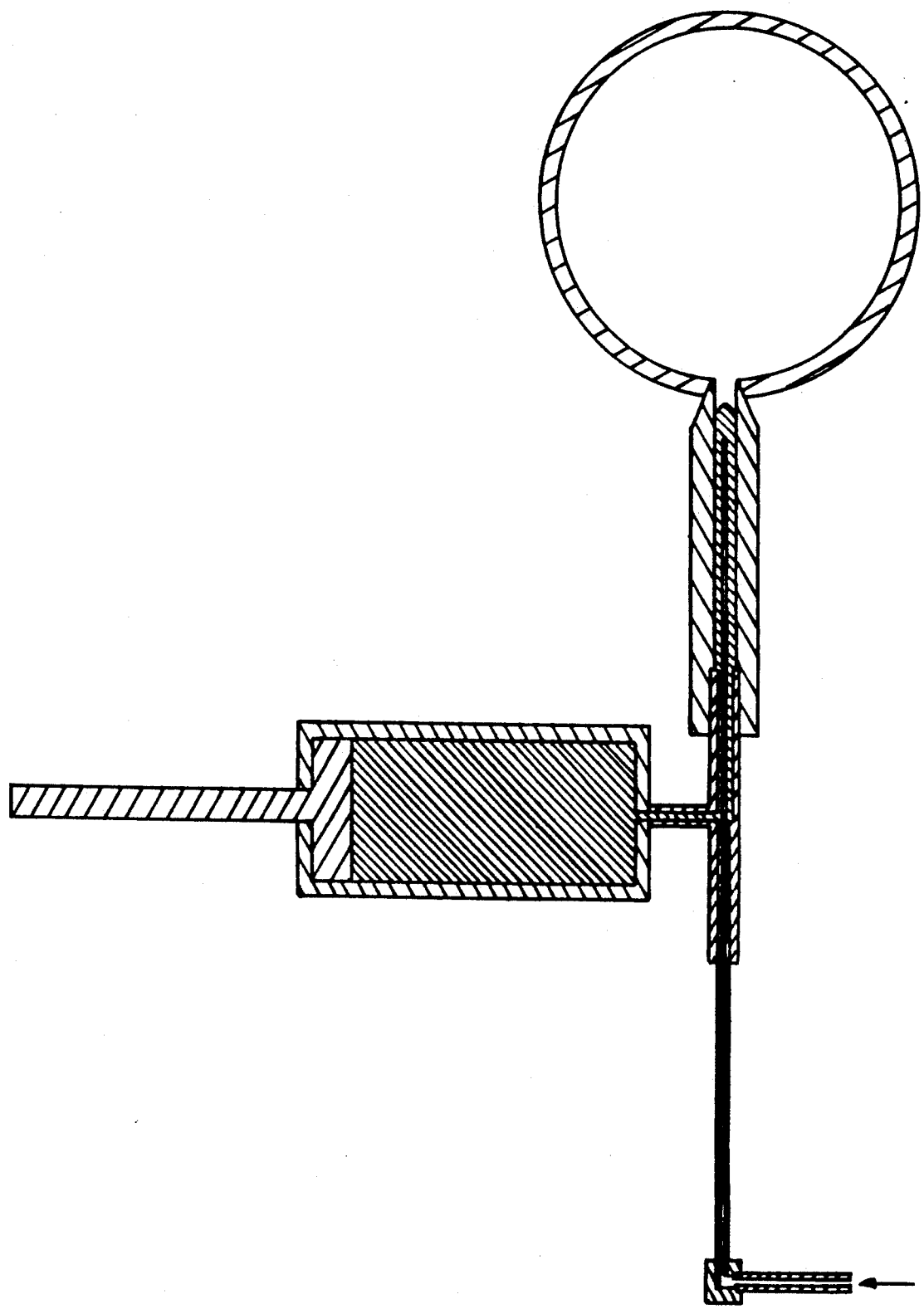
FIG. 28 illustrates the hardened remaining coating formed in a hollow sphere of FIG. 27.
Figure 29:
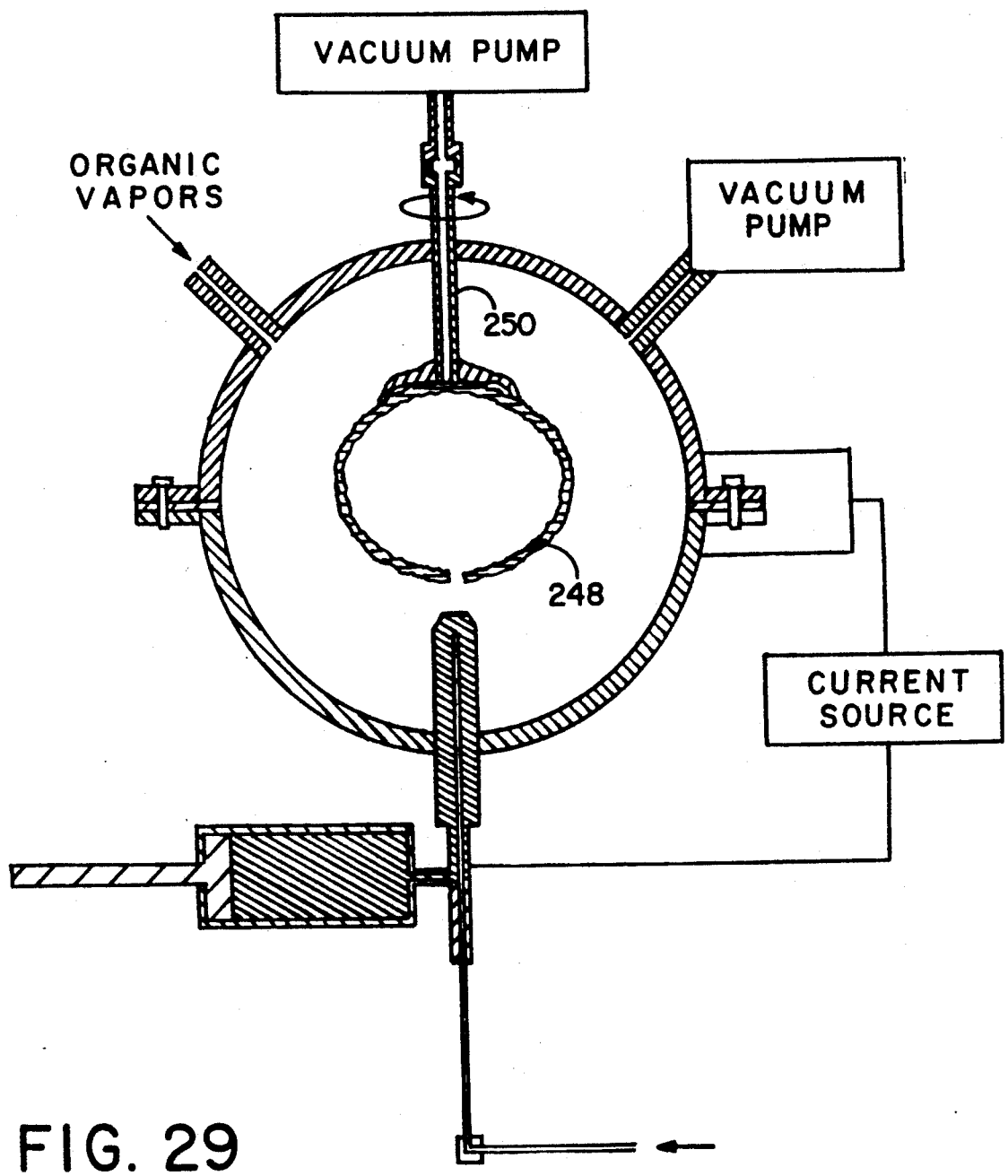
FIG. 29 illustrates the hardened hollow sphere being lifted off the nozzle in the chamber of FIG. 25.

Another process for production of spheres in zero G is seen in FIG. 24. This process utilizes conductive fluids in a zero gravitational field using the surface of the fluid as a plating surface. The idea of plating or producing a foil in sheets over mercury is known in the art and it is felt that adapting this process for use in a zero G environment wherein the natural tendency of fluid is to form spheres will produce desirable hollow spheres of this invention. Also this method utilizes plasma polymerization depositions to form the polymer or plastic spheres and the mechanism as illustrated forms spheres or solid balls of conductive fluid on which surface the plating or electro-deposition of the material occurs. Seen in FIG. 24 is a casing 220 combined of two spherical members 222 and 224 with means to open such spherical members 226 and 228 and with a vacuum port 230 and a vacuum pump associated therewith to create a vacuum inside the sphere and a second port 232 with which to enter vapors within the sphere. At the base of the sphere is an injector 234 and a piston means 236 with pipe 238 to inject materials through a pipeline leading to the injector 234 into the cavity 240 of the sphere 220. A source of electrical current 242 is provided between the injector nozzle and the shell portions of sphere 224 also. As the conductive liquid 246 is injected through injector 234 as seen in a partial view in FIG. 25, it forms a mass that is spherical in shape within the chamber at zero G. A deposit is then formed therearound such as an electroplating or other type of vapors through port 232 which form around the sphere as also seen in partial view in FIG. 26. One then removes the material forming the inner form for the sphere by injecting air as seen in partial view in FIG. 27 through the nozzle which displaces the liquid within the formed sphere 248 back down through the nozzle into the piston chamber 246. In this way what remains as seen in FIG. 28 is a sphere which can be mechanically lifted off the nozzle by arm 250 as seen in FIG. 29 which can rotate it in position. One then can open the chamber and retrieve the formed sphere 248 which can be of very thin plating and the like and be useful for a variety of things.

Figure 30:
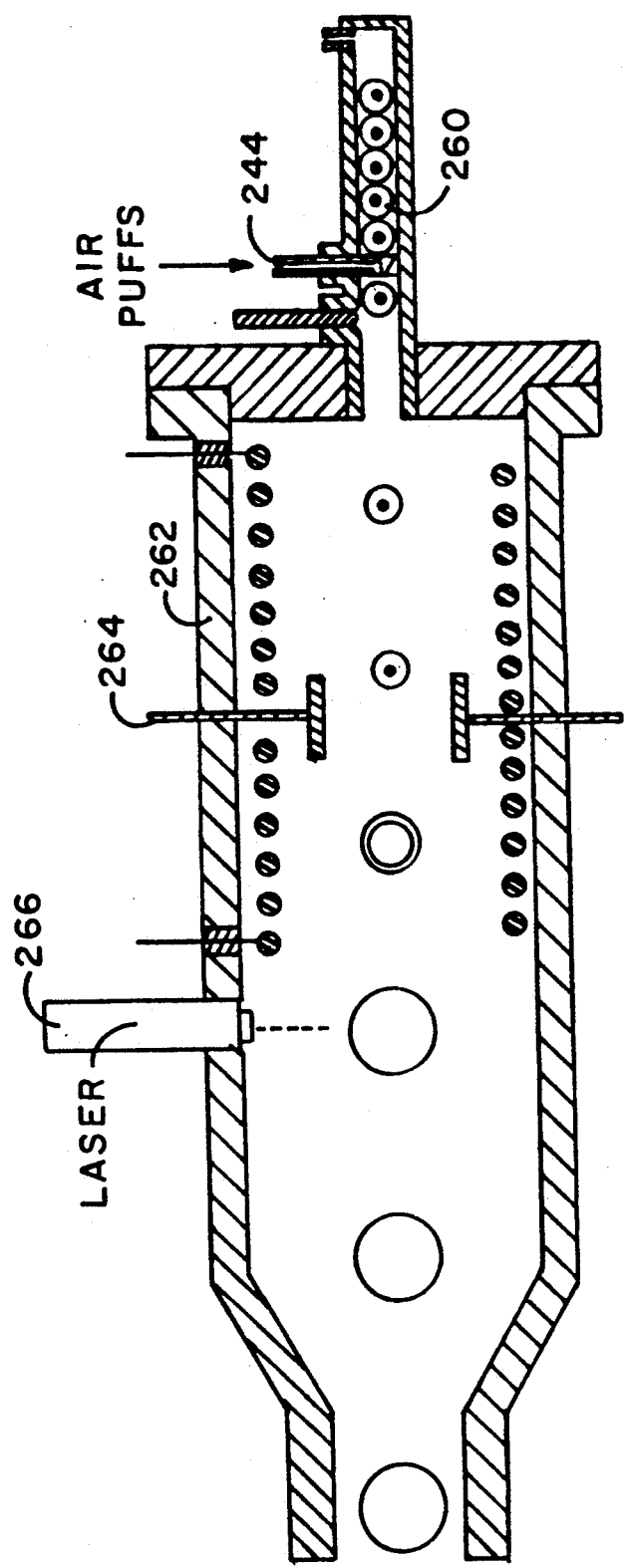
FIG. 30 illustrates a chamber for creating hollow spheres from pellets with heat-curing.
Figure 31:
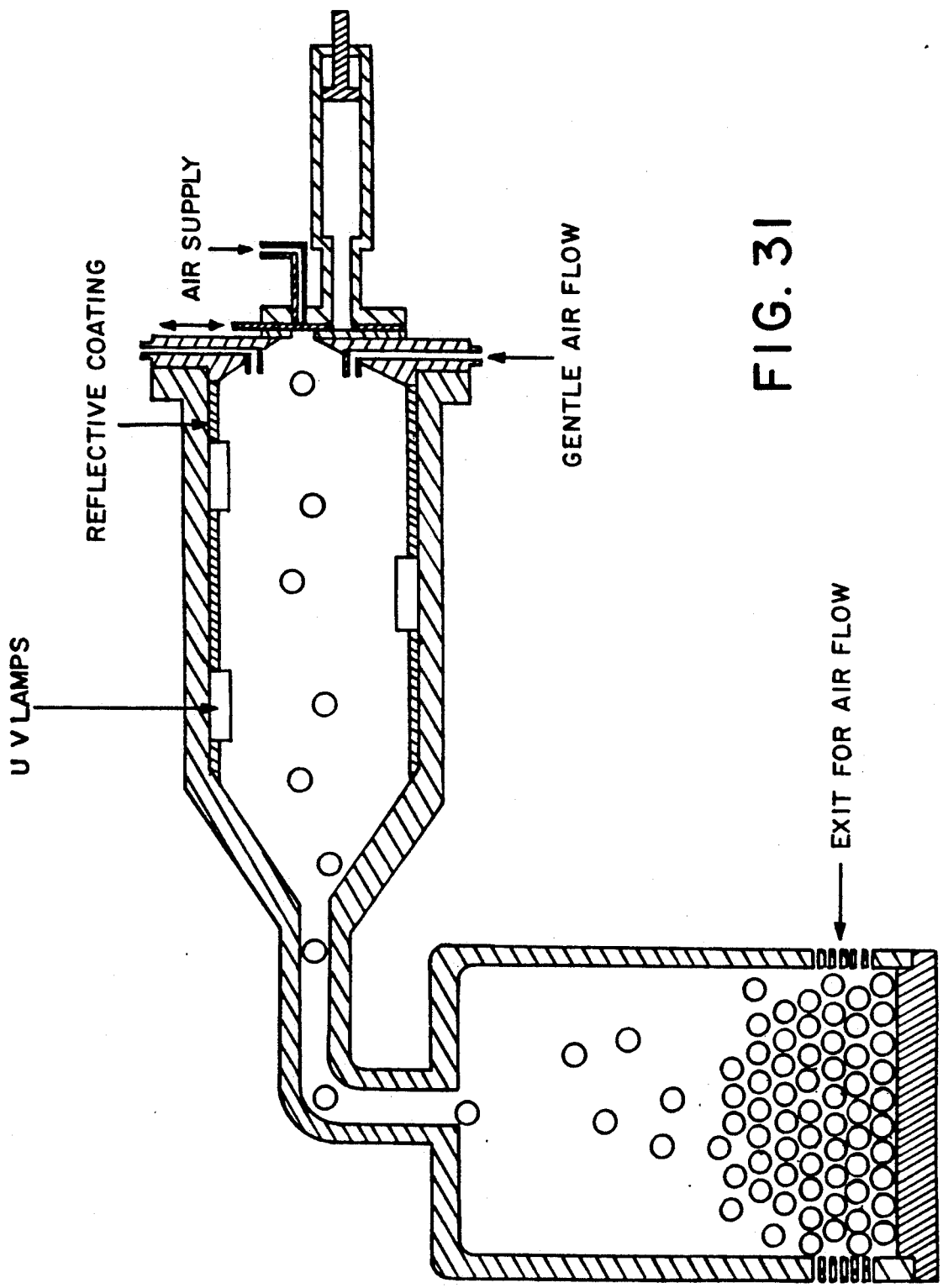
FIG. 31 illustrates a chamber for creating hollow spheres from pellets with ultraviolet light curing.
Figure 32:
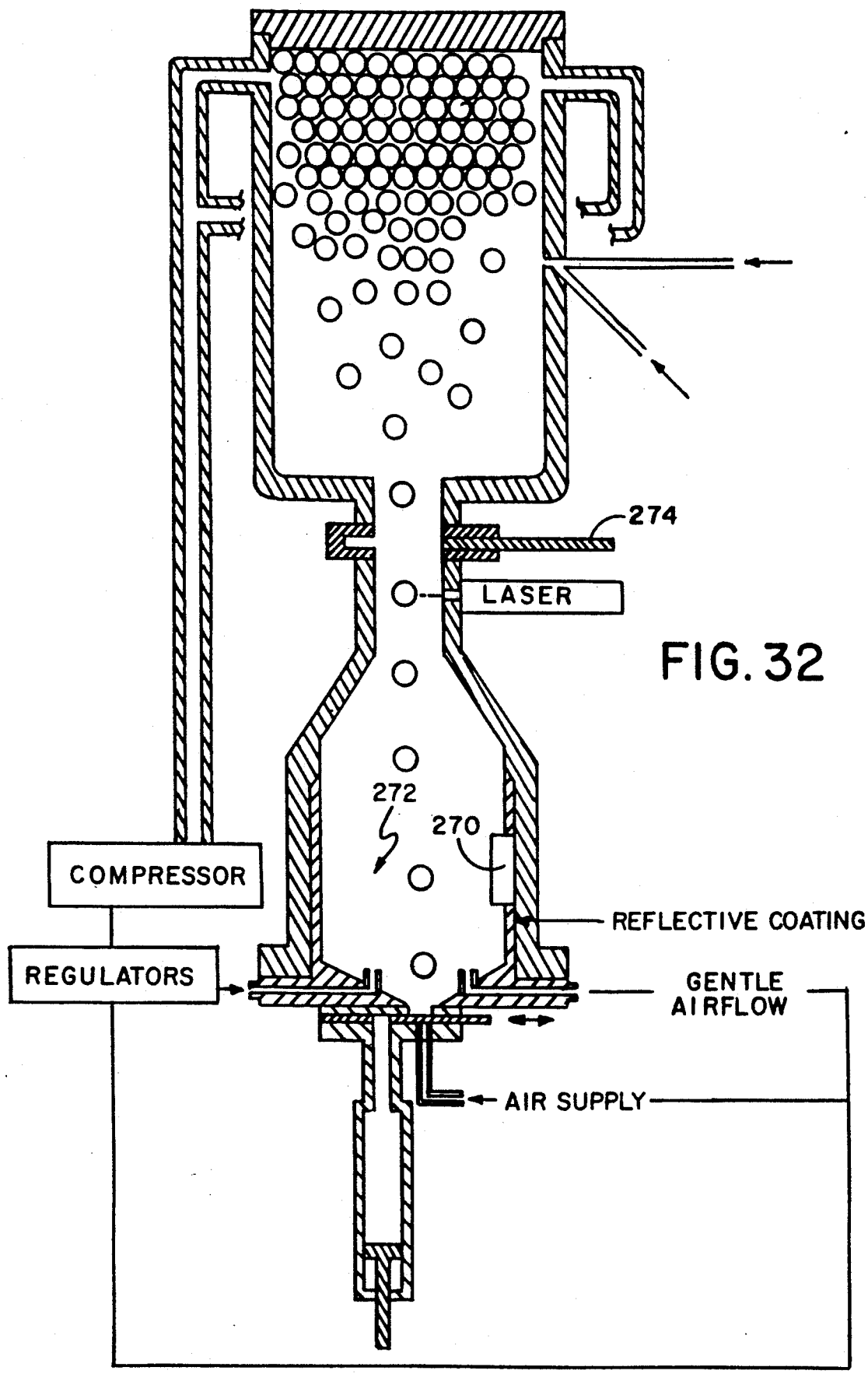
FIG. 32 illustrates a chamber for creating hollow spheres containing a vacuum.
Figure 33:
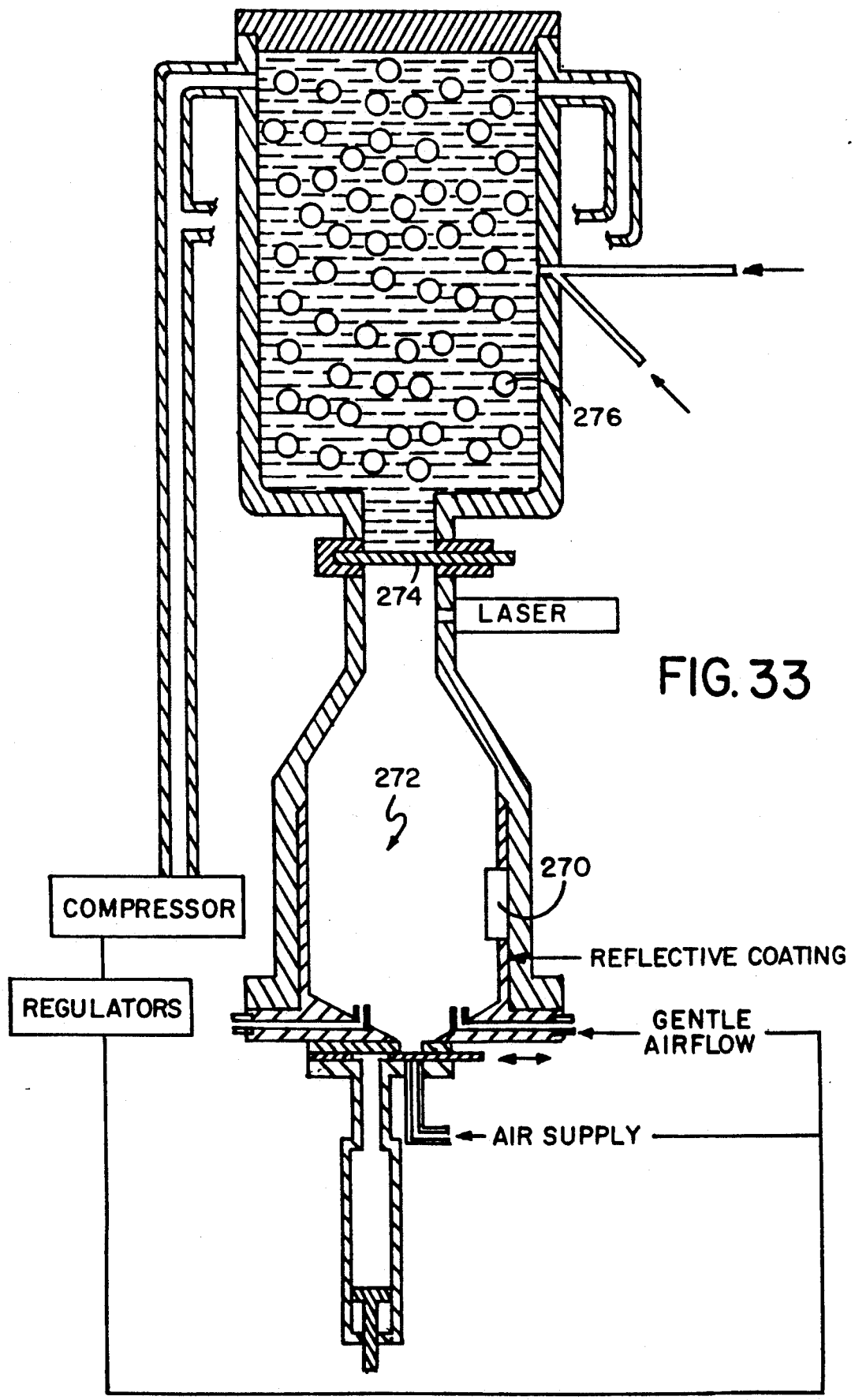
FIG. 33 illustrates the chamber of FIG. 32 with the collecting chamber vented to create a vacuum therein.
Figure 34:
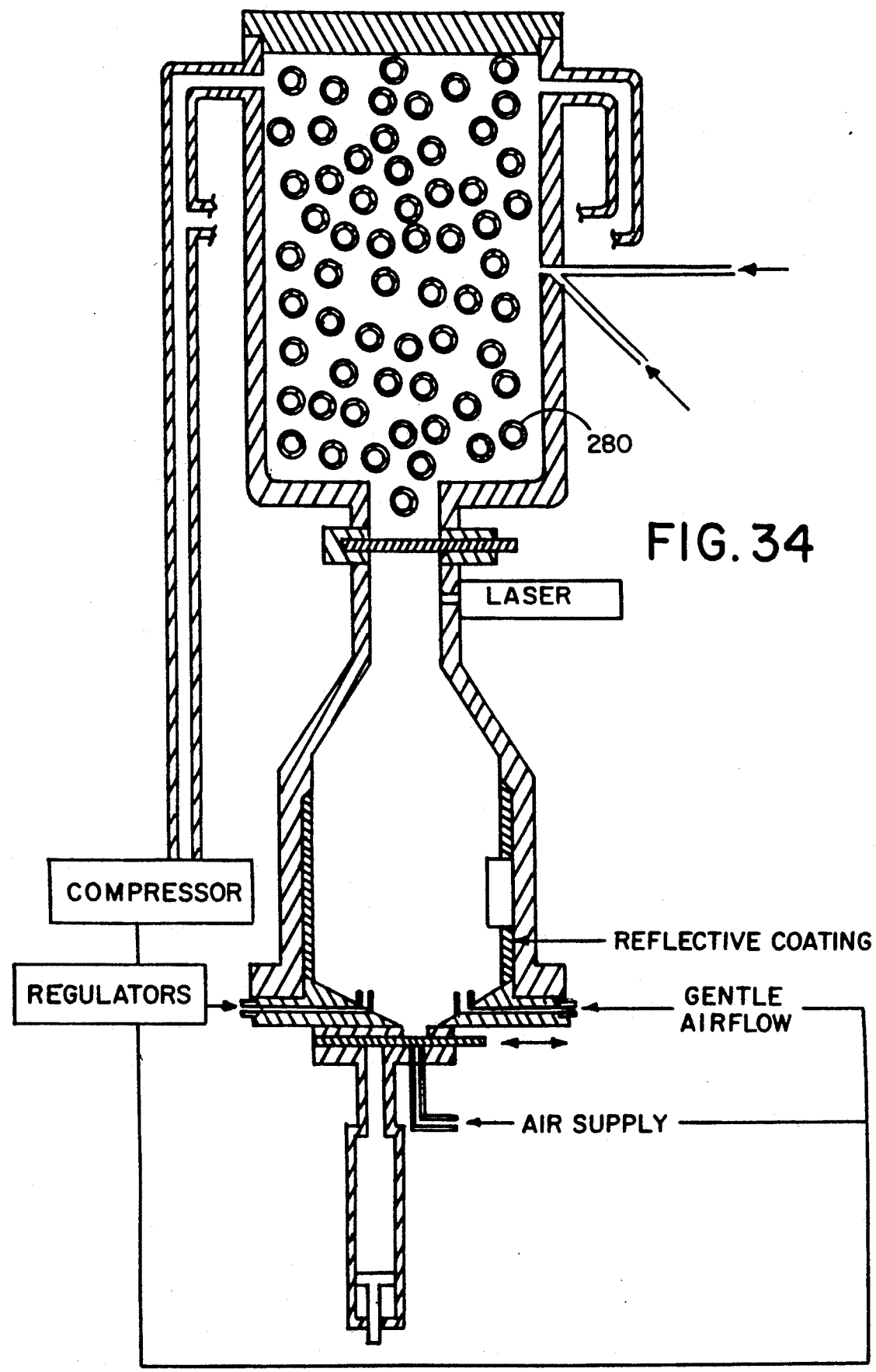
FIG. 34 illustrates the chamber of FIG. 33 with a resin entered to coat the spheres.
Figure 35:
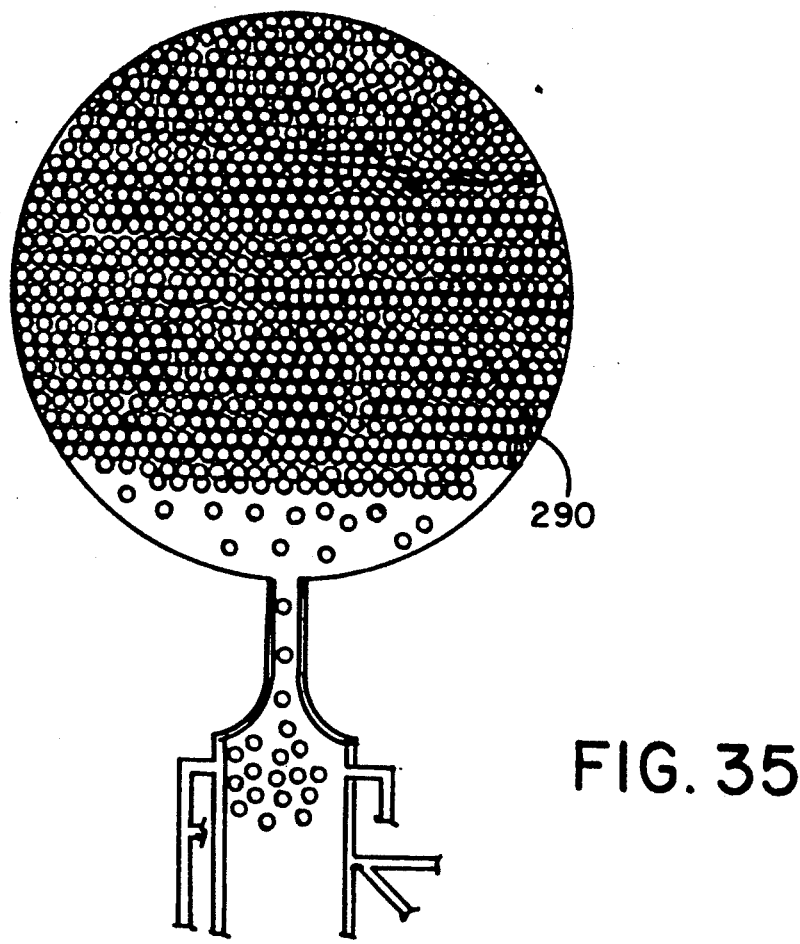
FIG. 35 illustrates several spheres collected in a bag for transport.
Figure 36:
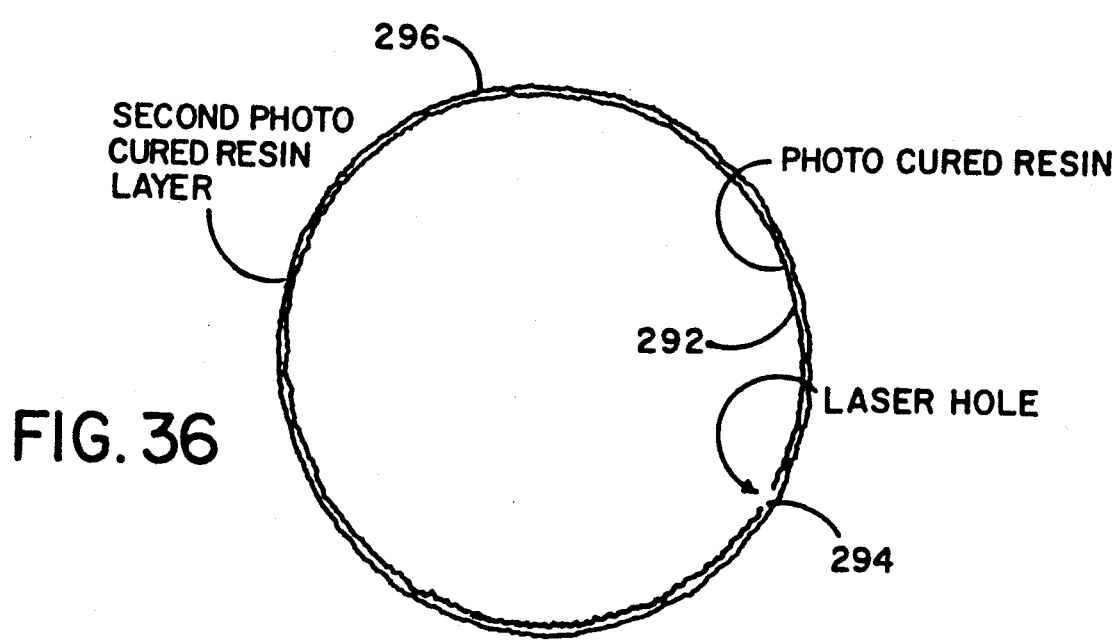
FIG. 36 illustrates a single sphere enlarged to show its filled laser hole.

Other processes for creation of spheres under zero G condition can utilize a resin coating around a gas pellet 260 such as seen in the device illustrated in FIG. 30. The device has a chamber 262 with heating means and each pellet is forced by an air puff from port 264 where it floats straight into the chamber where the heating means 262, being induction coils and the like, heat and melt the resin and the microwave generators 264 then detonate the azo or equivalent material crystals within the gas pellets center to start the gas generation. As the sphere expands, a laser 266 can pierce each sphere as it floats thereby for further processing. The spheres also can be made, as seen in FIG. 31, utilizing a UV-curable resin which is blown by an air supply into bubbles which pass by ultraviolet lamps, cure and then float to a containment area where they are held for formation into useful products. The gas used for blowing the bubbles can be hydrogen or helium and if such gas were used and held in the bubble, the utilization of a laser-made hole or second layer would not necessarily have to be performed as the bubble would already contain a lighter-than-air gas which could be utilized for a variety of uses. In some embodiments it may be desirable though to create a vacuum within the bubble so that after it has been pierced by the laser as seen in FIG. 32, it can pass into a vacuum chamber to draw out any gas therein and then means to apply a patch over the hole can be utilized before external pressure was applied around any bubble sphere which would otherwise refill the sphere. Seen in FIG. 33 after the bubbles are blown through the ultraviolet chamber where lamps 270 have solidified each sphere, allowing for any tendency of such spheres to shrink as they cure. A laser in the first UV chamber 272 burns a hole in each sphere while it is only semi-cured. If a type of resin though is utilized wherein the resin is fully cured within the UV chamber, the laser could be placed further down the production line. The next step is to seal off collection chamber 276 by means of gate 274 and to vent the atmosphere inside collection chamber 276 to outer space so that all gas will be vented out of the chamber to produce a pure vacuum therein. It would be desirable to do this process of venting the chamber slowly to avoid any sudden release of pressure which might otherwise break the spheres because the small size of the laser hole might not allow gas to escape from each sphere at a fast enough rate to equalize the pressure. The next step as seen in FIG. 34 is to enter a low viscosity heat-curable resin into the chamber, the small droplets of which 280 will coat the spheres as they attach themselves and spread over the spheres. It is known that liquids in a zero G environment have a tendency to spread over all surfaces completely and such droplets will have the same action. The droplets will also cover the hole in each sphere but the resin should not enter into the inside of the sphere because of the small size of the hole. The vapor pressure of such a resin should be low so that it will not volatize in the vacuum and it should be composed of small monomeric molecules of low viscosity and also be heavy so they will be of low volatility. An alternate air-curable resin could be a fluorine-based monomer that is UV-curable which could form an alternate type of processing with UV lights in the chamber but either type or equivalent could work in the system as described herein. It would not be desirable to enter too much resin material around the spheres and even if a small amount were utilized, the resin coating would certainly be provided over the holes of at least 80-90% of such spheres. The next step is to introduce heat to cure the resin or in the case of UV-curable resin, UV lights could be utlized to cure the resin. Such small vacuum spheres could be entered into a larger woven fabric sphere with a small amount of air used to transport the spheres into such woven bag 290 as seen in FIG. 35. Once the bag is full of spheres, it can be sealed and the air between the spheres can be vented to space to provide a vacuum between the spheres and the bag. The bag can be manufactured of a kevlar woven fabric or equivalent materials. FIG. 36 is a view of a single sphere with the cured inner resin layer 292, the laser hole in the inner layer 294 and the second of photo-cured resin layer 296 around inner layer 292. Bubbles of this invention have many uses if manufactured in space but then returned to earth. One such usage could be for covering large areas of the ocean for wave reduction which is important in some recent ocean technologies. If they are processed so that they are of black material, they could heat by absorption of the sun's energy the water underneath to encourage types of ocean food harvesting. The spheres would also be easy to dispose of than expanded polystyrene or other materials since they have so little actual substance in their structure merely being a shell. They would, if placed on the water, tend to roll with the wind and transfer any heat they collect to the water underneath. They also could be utilized to fabricate large shapes if glued together.

Although the present invention has been described with reference to particular embodiments, it will be apparent to those skilled in the art that variations and modifications can be substituted therefor without departing from the principles and spirit of the invention.

I claim:

1. A method to form hollow spheres without using a mold comprising the steps of:
    immersing a molten globule of resin material to be formed into a sphere in a medium maintained at the melting temperature of said material within a chamber at zero gravity;
    engulfing a non-active gas-generating pellet within said globule of material;
    activating said gas-generating pellet;
    generating a gas from said gas-generating pellet;
    expanding said globule by said pressure of said generated gas; and
    forming a hollow sphere from said globule by said increasing volume of expansion by said gas.

2. A method to form hollow spheres without suing a mold comprising the steps of:
    immersing a molten globule of resin material to be formed into a sphere in a medium maintained at the melting temperature of said material within a chamber at zero gravity;
    engulfing a non-active gas-generating pellet within said globule of material;
    activating said gas-generating pellet;
    generating a gas from said gas-generating pellet;
    expanding said globule by said pressure of said generated gas;
    forming a hollow sphere from said globule by said increasing volume of expansion by said gas;
    cooling said chamber to condense said medium; and
    removing said medium from said chamber.

3. The method of claim 2 further including the step of: curing said hollow sphere.

4. The method of claim 3 further including the step of: carbonizing said hollow sphere.

5. The method of claim 4 wherein said carbonizing of said hollow sphere is accomplished by the step of:
    baking said hollow sphere within said chamber at temperatures high enough to carbonize said material of said hollow sphere.

6. A method to form hollow spheres comprising the steps of:
    immersing a globule of molten material to be formed into a sphere in a medium maintained at the melting temperature of said material within a chamber at zero gravity;
    injecting gas into said globule of molten material;
    expanding said globule of molten material by the pressure of said gas; and
    forming a hollow sphere from said globule by said expansion by the pressure of said gas.

7. The method of claim 6 further including the step of:
    embedding fibers in said material while said material is still molten.

8. A method to form hollow spheres comprising the steps of:
    immersing a globule of molten material to be formed into a sphere in a medium maintained at the melting temperature of said material within a chamber at zero gravity;
    injecting as into said globule of molten material;
    expanding said globule of molten material by the pressure of said gas;
    forming a hollow sphere from said globule by said expansion by the pressure of said gas; and
    embedding fibers in said material while said material is still molten.

9. A method of forming hollow spheres comprising the steps of:
    forming a spherical pellet of resin having a pellet of gas-generating material in its center.
    placing said pellet in a heated chamber at zero gravity;
    melting said resin by said heat in said chamber to form a uniform molten globe around said gas-generating pellet;
    increasing atmospheric pressure in said chamber;
    activating said gas-generating pellet to produce gas;
    controlling said chamber pressure to allow said gas to expand the resin surrounding it into a hollow sphere of desired size;
    cooling said chamber and hollow sphere;
    forming a small aperture in said sphere to equalize pressure between the inside of said hollow sphere and said chamber pressure; and
    curing said resin hollow sphere.

10. A method of forming a hollow sphere comprising the steps of:
    forming a spherical pellet of resin having a pellet of gas-generating material in its center;
    placing said pellet in a heated chamber at zero gravity;
    forcing said pellet to pass through said chamber by directing an air puff against it;
    melting said resin by said heat in said chamber to form a uniform molten globe around said gas-generating pellet;
    activating said gas-generating pellet to produce gas; and
    forming a small aperture in said sphere.

* * * * *